Dec. 19, 1922.

W. J. NEWTON.
ELECTRIC FLUSH RECEPTACLE.
FILED APR. 24, 1920.

1,439,438.

INVENTOR
William J. Newton
BY
Wooster & Bradbury
ATTORNEYS

Patented Dec. 19, 1922.

1,439,438

UNITED STATES PATENT OFFICE.

WILLIAM J. NEWTON, OF BRIDGEPORT, CONNECTICUT, ASSIGNOR TO HARVEY HUBBELL, INC., OF BRIDGEPORT, CONNECTICUT, A CORPORATION OF CONNECTICUT.

ELECTRIC FLUSH RECEPTACLE.

Application filed April 24, 1920. Serial No. 376,240.

*To all whom it may concern:*

Be it known that I, WILLIAM J. NEWTON, a citizen of the United States, residing at Bridgeport, county of Fairfield, State of Connecticut, have invented an Improvement in Electric Flush Receptacles, of which the following is a specification.

This invention relates to electric receptacles of the type which are adapted to be attached to wall cases and outlet boxes and are provided with face plates. As is well known, the tops of wall cases and outlet boxes are often out of parallel with the surfaces of the walls in which they are placed and outlet boxes are frequently located at greater or less distances below the surfaces of walls. It is one of the objects of the present invention to produce a receptacle which is especially adapted to be quickly and properly adjusted in a wall case or outlet box so that its face plate will lie parallel with and in close contact with the surface of the wall. A further and important object is to produce a receptacle provided with novel and improved adjusting means which are situated substantially within the compass of the receptacle and which can be conveniently and easily manipulated.

With the above and other objects in view, the invention consists of the construction, arrangement and combination of parts as now to be fully described and hereinafter specifically claimed.

Figure 1:
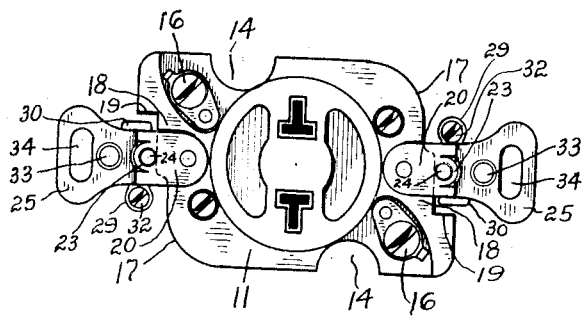
Figure 4:
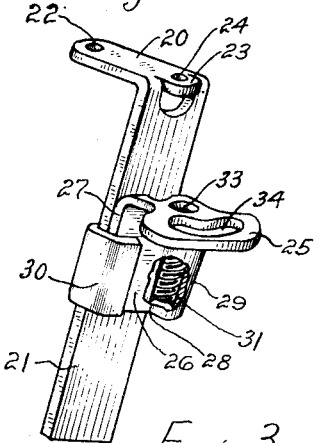
Figure 2:
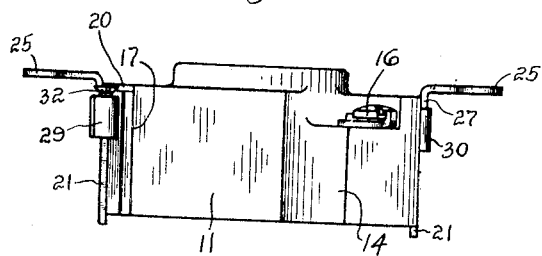
Figure 3:
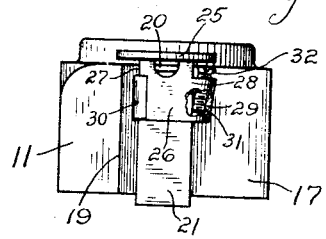

In the accompanying drawing forming a part of this specification,

Fig. 1 is a plan view of the novel receptacle;

Fig. 2 a side elevation;

Fig. 3 an end view;

Fig. 4 a perspective view of one of the adjusting supports; and

Figure 5:
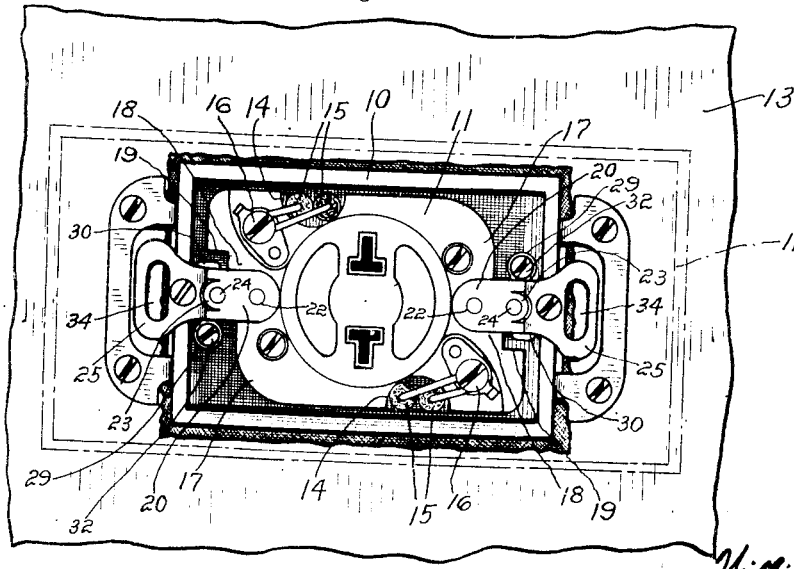

Fig. 5 shows the novel receptacle as when attached to a wall case.

10 denotes a wall case which is shown as secured in place in usual manner, 11 is the body of the receptacle and 12 is the face plate thereof (shown in dotted lines only and partially broken away to disclose underlying parts) which is adapted to lie parallel with and in close contact with the surface of the wall, indicated by 13.

In opposite sides of the body of the receptacle are channels 14 of sufficient size to accommodate lead wire cables denoted by 15. Binding screws 16 for the lead wires are provided. The opposite ends of the body of the receptacle are of similar configuration, each being shaped, as more clearly disclosed in Figs. 1, 3 and 5, to provide a curved cut away portion 17 which merges into an attaching portion 18 for the adjacent adjusting support and a shoulder portion 19 which is of substantial and uniform depth.

The adjusting supports are duplicates of each other. Each consists of a receptacle carrying member and a wall case or outlet box attaching member. The receptacle carrying members are substantially L-shaped and each comprises a horizontal arm 20 and a depending arm 21. The horizontal arms are provided with holes 22 whereby the adjusting supports are secured to the attaching portions of the receptacle, and from each depending arm is struck a lug 23 which is positioned at the bend in the L-shaped receptacle carrying member, as more clearly shown in Fig. 4. Lugs 23 are provided with threaded openings 24 whereby the face plate may be secured to the receptacle. The wall case or outlet box attaching members are each preferably made from a single L-shaped strip of metal. The short arm of the L-shaped strip is bent at approximate right angles to the long arm to provide an attaching arm 25 for the wall case or outlet box, and the lower portion of the long arm is adapted to compose a vertical arm 26 one side edge of which lies flush with an edge of the depending arm of the receptacle carrying member as more clearly indicated at 27 in Fig. 4. Vertical arm 26, on a line adjacent the opposite edge of the depending arm of the receptacle carrying member, indicated at 28, merges into a downwardly and inwardly extending tube 29 which is open on one side as clearly shown in Figs. 3 and 4, and beyond the tube the long arm of the L-shaped strip is first made to extend parallel to the vertical arm and is then bent around edge 27 thereof, as indicated at 30. A slide for the depending arm having in one of its side edges a downwardly and inwardly extending tube which is open to the depending arm is thus provided. The tube is threaded, as denoted at 31, and is adapted to receive a set screw 32. The arrangement is such that the set screw may be driven into the tube so that its lower portion bears against the adjacent edge of the depending arm and causes said arm to be frictionally held between the set screw and the opposite side edge of the slide, as will be readily understood, or the set screw may be loosely positioned in the tube so that the depending arm may freely slide with respect to the attaching member. Each attaching arm 25 is provided near its inner end with a hole 33 whereby it may be secured to a wall case and near its outer end with an elongated slot 34 whereby it may be adjustably secured to an outlet box. While one way of making the wall case or outlet box attaching members has been described, it is to be understood that these members may be made in any preferred manner and may each consist of more than a single strip, it being essential so far as the present invention is concerned that one of these members have a depending arm and the other a slide for the depending arm and also provided with a tubular portion properly positioned at one side edge of the slide to carry a set screw or equivalent means whereby the members may be rigidly held together in the manner hereinbefore described. When the adjusting supports are secured to the attaching portions of the receptacle, the tubes are located adjacent the curved cut away portions thereof, and the attaching arms of the attaching members extend outwardly so that they may be secured to a wall case or outlet box.

Having secured the attaching arms to a wall case or outlet box, the depending arms are next positioned in the slides so that the receptacle bears the proper relation with respect to the surface of the wall. The set screws are then driven in to insure the adjusted position of the receptacle. As will be apparent from Fig. 5, the arrangement provides for locating the set screws in the same vertical plane as are the depending arms of the receptacle carrying member. Not only are the screws thus rendered accessible so that they may be manipulated by means of a standard screw driver without interference from the curved cut away portions of the receptacle, but provision is additionally made for locating the adjusting means, including the depending arms, the slides, and the set screws, well within the compass of the receptacle. Receptacles of larger sizes than heretofore can, consequently, be placed in outlet boxes of standard sizes.

What I claim is:

1. In an electric flush receptacle, adjusting supports, each of said supports consisting of a receptacle carrying member provided with a depending arm, a wall case or outlet box attaching member provided with a slide for said depending arm, and having located in one side edge of said slide a threaded tube, and means carried by said tube and having threaded engagement therewith whereby said carrying member and attaching member may be rigidly secured to each other.

2. In an electric flush receptacle, adjusting supports, each of said adjusting supports consisting of a receptacle carrying member having a depending arm and a wall case or outlet box attaching member provided with a slide for said depending arm in one side edge of which is arranged means whereby said carrying member and attaching member may be rigidly secured to each other, said means comprising a screw having threaded engagement with the slide and adapted to press against an edge of the depending arm.

3. In an electric flush receptacle, adjusting supports, each consisting of a receptacle carrying member having a depending arm and a wall case or outlet box attaching member provided with a slide for said depending arm in one side edge of which is located a set screw, the set screw extending longitudinally of the edge of the depending arm, so that it may be manipulated without interference from the receptacle and the depending arm can be slid with respect to the attaching member or can be rigidly secured thereto, as may be desirable, said set screw adapted to engage an edge of the depending arm to secure it to the attaching member in adjusted position.

4. In an electric flush receptacle, adjusting supports, each of which consists of a receptacle carrying member having a depending arm and a wall case or outlet box attaching member provided with a slide in one side edge of which is located a threaded tube provided with a set screw extending longitudinally of the edge of the depending arm, and said depending arms being adapted for adjustment in said slides and to be held in adjusted positions by means of said set screws.

5. In an electric flush receptacle, adjusting supports, each of which consists of a receptacle carrying member having a depending arm and a wall case or outlet box attaching member provided with a slide for the depending arm in one side edge of which is located a downwardly and inwardly extending threaded tube provided with a set screw by means of which said members may be rigidly secured to each other, each of said set screws lying in the vertical plane of its corresponding depending arm so that it may be manipulated without interference from the receptacle.

6. In an electric flush receptacle, a receptacle carrying member having a depending arm, a wall case or outlet box attaching member provided with a slide for said depending arm, and means carried in one side edge of said slide whereby said members can be rigidly secured to each other, said means comprising a screw extending longitudinally of the slide and adapted to engage the depending arm.

7. In an electric flush receptacle, a receptacle carrying member having a depending arm, a wall case or outlet box attaching member provided with a slide for said depending arm, and a downwardly and inwardly extending tube located in one side edge of said slide and threaded to carry a set screw adapted to engage the depending arm whereby said members can be rigidly secured to each other.

8. In an electric flush receptacle, a receptacle carrying member having a depending arm, a wall case or outlet box attaching member provided with a slide in one side edge of which is a downwardly and inwardly extending threaded tube one side of which is open to an edge of the depending arm, and a set screw carried by said tube and adapted to bear against the depending arm.

9. In an electric flush receptacle, a receptacle carrying member having a depending arm, a wall case or outlet box attaching member provided with a slide in one side edge of which is a downwardly and inwardly extending threaded tube one side of which is open to an edge of the depending arm and a set screw carried by the tube and arranged so that its lower portion will bear against the depending arm to frictionally hold said arm between said set screw and the opposite side edge of said slide.

10. In an electric flush receptacle, a wall case or outlet box attaching member provided with a slide, a receptacle carrying member having a depending arm adapted to pass through said slide and means positioned in one side edge of the slide for rigidly securing said members to each other, said means comprising a screw threaded in the slide and extending longitudinally thereof and adapted to engage the depending arm.

11. In an electric receptacle, a receptable carrying member, a wall case or outlet box attaching member, one of said members having a depending arm and the other member being provided with a slide for said arm and having a downwardly and inwardly extending threaded, tubular portion at one side thereof, and a set screw in said tubular portion extending longitudinally of an edge of the arm and adapted to engage the same to secure the elements together in adjusted positions.

In testimony whereof I affix my signature.

WILLIAM J. NEWTON.